April 6, 1954 — A. M. MacCALLUM — 2,674,711
AIRCRAFT CONTROL SYSTEM MONITOR
Filed May 16, 1950
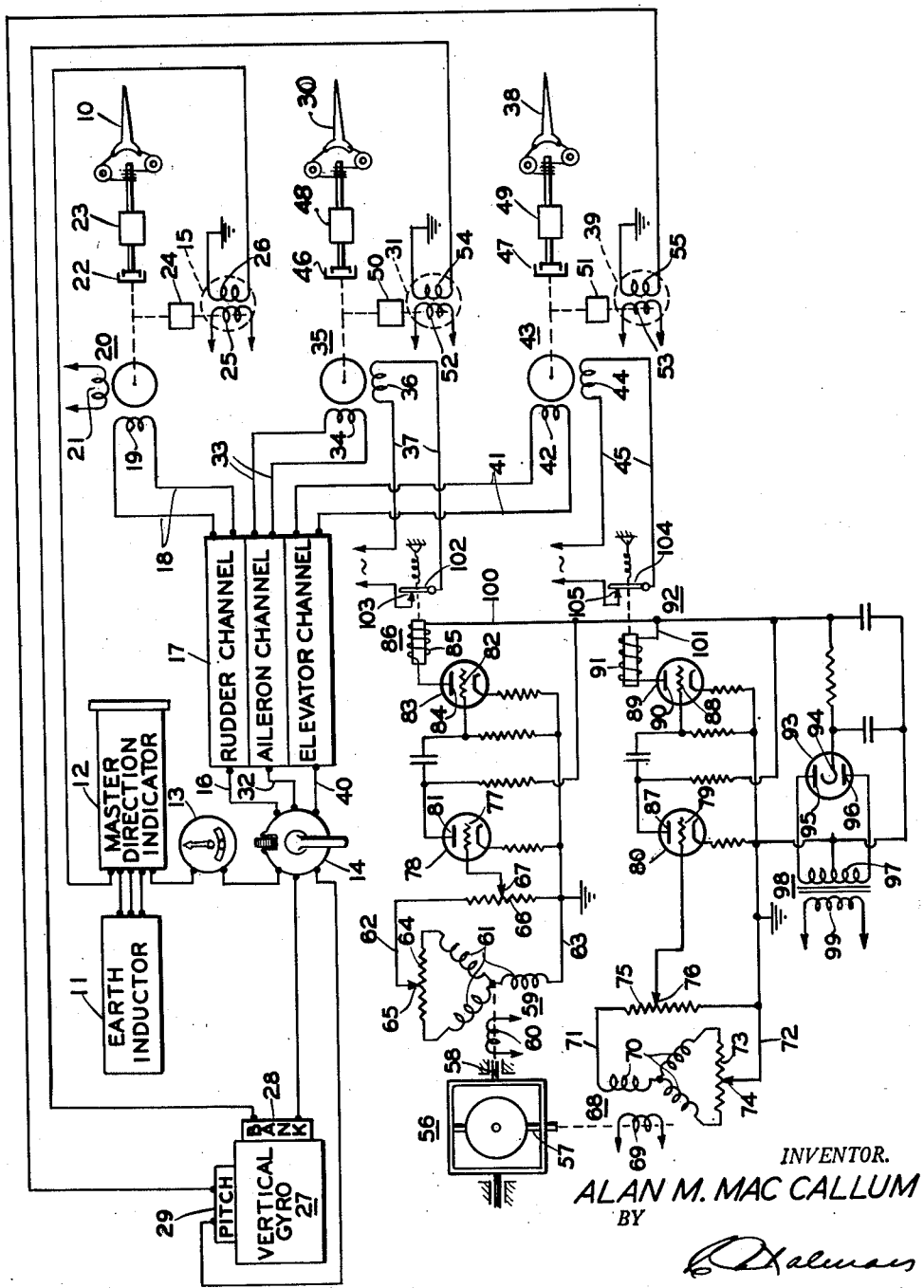
INVENTOR.
ALAN M. MAC CALLUM
BY
ATTORNEY Patented Apr. 6, 1954

2,674,711

UNITED STATES PATENT OFFICE 2,674,711

AIRCRAFT CONTROL SYSTEM MONITOR

Alan M. MacCallum, Maywood, N. J., assignor to Bendix Aviation Corporation, Teterboro, N. J., a corporation of Delaware Application May 16, 1950, Serial No. 162,162

7 Claims. (Cl. 318—489)

1

The present invention relates generally to safety or monitoring apparatus for positioning systems and more particularly to apparatus of this general character adapted for preventing automatically improper control of an aircraft by an automatic pilot system.

Automatic pilot systems currently in use on aircraft constitute relatively complicated and intricate mechanisms which may develop internal failures causing abnormal operation of the system to thereby induce undesirable and dangerous craft attitudes. The present invention contemplates the provision of novel safety or monitoring apparatus, entirely independent of the automatic pilot system, responsive to predetermined angular deflection of the aircraft about one or more of its control axes for disabling automatically the system from operating the craft surfaces either by de-energizing the clutches between the servo motors and their related control surfaces or by making the motors ineffective on the control surfaces by removing the motor power supply.

An object of the present invention, therefore, is to provide novel and automatically operable means for assuring the proper and safe operation of a positioning system such as an aircraft automatic pilot.

Another object of the invention is to provide a novel safety monitor for an aircraft automatic pilot which measures the angular deflection of the craft from a given reference induced by the automatic pilot and disables the automatic pilot from controlling the craft when craft attitudes exceed preset limits.

A further object is to provide a novel safety monitor for an aircraft automatic pilot which is operative automatically during predetermined craft roll or pitch attitudes induced by the automatic pilot to disable the automatic pilot from controlling the craft.

Still another object of the present invention is to provide a novel and relatively simple arrangement for monitoring the operation of an aircraft automatic pilot system which is separate from and independent of the pilot system.

The above and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration and description only and is not designed as a definition of the limits of the invention.

2

The single figure of the drawing is a diagrammatic illustration of one embodiment of the novel safety apparatus of the present invention for monitoring the operation of a conventional aircraft automatic pilot.

Referring now to the drawing for a more detailed description of the novel monitoring arrangement of the present invention, it is shown as applied to a conventional all-electric, three axes of control aircraft automatic pilot. As there shown, such an automatic pilot generally comprises for the control of a rudder surface 10, a compass consisting of a stabilized earth inductor element 11 and a master direction indicator device 12 which receives and reproduces for control purposes the signals of element 11. In addition to the compass signal, rate of turn, course turn and follow-up signals are developed by a rate of turn device 13, a turn signal generator incorporated in a manual turn control unit 14 and an inductive follow-up device 15.

The various signal generators are connected with each other in a series signal chain and by way of a conductor 16 with the input of the rudder channel of an amplifier 17, the output of such channel being fed by way of leads 18 to the varible phase winding 19 of a two phase induction motor 20 whose second or fixed phase winding 21 is connected with a suitable power supply source (not shown). Motor 20 drivably connects through an electromagnetic clutch 22 and a gear reduction mechanism 23 with the rudder surface, and through a gear reduction mechanism 24 with the wound rotor 25 of inductive follow-up device 15, whose stator winding 26, constituting the trailing end of the signal chain is fixed with respect to the craft and has one end grounded as shown.

For controlling the aircraft in bank and pitch a vertical gyro 27 is provided having bank and pitch take-off signal generators 28 and 29. For control of aileron surface 30, bank, follow-up and bank trim signals are provided by bank take-off 28, inductive follow-up device 31, and a bank trim signal generator incorporated in turn control unit 14. The various signal generators of the aileron channel are connected with each other in a series signal chain and by way of a conductor 32 with the input of the aileron channel of the amplifier, the output of which connects by way of leads 33 with the variable phase winding 34 of a two-phase induction motor 35, whose second or fixed phase winding 36 is connected with a suitable power supply source (not shown) by way of leads 37 in a manner to presently appear.

For control of elevator surface 38, on the other hand, pitch, follow-up and pitch trim signals are provided by pitch take-off 29, an inductive follow-up device 39 and a pitch trim signal generator incorporated in turn control unit 14. These signal generators like those of the rudder and aileron channels are connected with each other in a series signal chain and by way of a conductor 40 with the input of the elevator channel of the amplifier, the output of the latter channel connecting by way of leads 41 with the variable phase winding 42 of a two-phase induction motor 43, whose second or fixed phase winding 44 is connected with a suitable power supply source (not shown) by way of leads 45 in a manner to presently appear.

Aileron and elevator motors 35 and 43 drivably connect through electromagnetic clutches 46 and 47, respectively, and gear reduction mechanisms 48 and 49 with aileron and elevator surfaces 30 and 38 and through gear reduction mechanisms 50 and 51 with wound rotors 52 and 53 of inductive follow-up devices 31 and 39, whose stator windings 54 and 55 are fixed with respect to the craft. Stator 54 of aileron follow-up device 31 has one end thereof grounded and constitutes the trailing end of the aileron signal chain while stator 55 of elevator follow-up device 39 has one end thereof grounded and constitutes the trailing end of the elevator signal chain.

As heretofore indicated, aircraft automatic pilot systems because of their intricate nature are subject to malfunction leading to improper operation as a result of which an aircraft may be maneuvered into undesirable and dangerous attitudes. The novel safety arrangement of the present invention constitutes in effect an attitude monitor which is not a part of the pilot system but is separate and distinct from the system so that failures of the system will in no way impair the desired function of the monitor.

While the novel monitor hereof may be made to control the electromagnetic clutches of the automatic pilot to disconnect the servo motor or motors from the related control surface or surfaces during abnormal pilot operation, it has been here shown as controlling the power supply to the fixed phase windings of the motors. While the servo motors have been shown as connected to individual power sources, they may well be connected with a common power supply source.

The novel attitude monitor hereof measures the angular deflection of the aircraft from a reference position induced by the automatic pilot system about the craft roll and pitch axes and, if desired, about its yaw axis and automatically disables the automatic pilot system from controlling the craft about any one or more axes when the deflection being measured exceeds preset limits. Deflection measurement is accomplished by the use of a gyro vertical 56 which is separate and distinct from the automatic pilot system. The gyro may be arranged with its minor trunnions 57 parallel with the craft transverse axis to thereby define the craft pitch axis and with its major trunnions 58 parallel with the craft's longitudinal axis to thereby define the craft bank axis.

In order to measure the amount of craft displacement about its roll axis, an inductive transmitter device 59 is provided having a suitably energized wound rotor 60 connected for movement by major trunnion 58 and a three-phase wound stator 61 which is fixedly mounted relative to the rotor. Motion of the rotor relative to its stator will develop voltages in the stator whose resultant across output leads 62 and 63 will represent a measure of the angle of craft displacement about the roll axis. Two of the phase windings of the stator may be interconnected by a resistor 64 engageable by a slider 65 to provide a centering control for the roll axis. In this manner roll trim may be set for any desired flight attitude. A resistor 66 interconnects output leads 62 and 63 and is engaged by a slider 67, movement of the latter slider relative to its resistor providing angle control.

In a substantially similar manner, for measuring the amount of craft displacement about its pitch axis, an inductive transmitter device 68 is provided having a suitably energized wound rotor 69, which may be connected to an energizing source common to wound rotor 60, rotor 69 being connected for movement by minor trunnion 57 and the device further having a three-phase wound stator 70 which is fixedly mounted relative to the rotor. For example, stator 70 may be fixed to the gyro gimbal which supports the rotor casing for angular movement by trunnions 57. Motion of rotor 69 relative to its stator will develop voltages in the stator whose resultant across output leads 71 and 72 will represent a measure of the angle of craft displacement about the pitch axis. Two of the phase windings of the stator may be interconnected by a resistor 73 engageable by a slider 74 to provide a centering control for the pitch axis. In this manner, pitch trim may be set for any desired flight attitude. A resistor 75 interconnects output leads 71 and 72 and is engaged by a slider 76, movement of the latter slider relative to its resistor providing angle control.

The roll signal developed by inductive device 59 and preset by slider 67 is impressed on the grid 77 of an amplifier tube 78 while the pitch signal developed by inductive device 68 and preset by slider 76 is impressed on the grid 79 of an amplifier tube 80. The plate 81 of tube 78 is connected with a grid 82 of a second vacuum tube 83 whose plate 84, in turn, connects with one end of a winding 85 of a relay 86 while the plate 87 of tube 80 is connected with a grid 88 of a second vacuum tube 89 whose plate 90, in turn, connects with one end of a winding 91 of a relay 92.

Direct current for plates 84 and 90 of tubes 83 and 89 is provided by a full wave rectifier tube 93 having a cathode 94 and two anodes 95 and 96. Anode 95 connects with one end of a center tapped and grounded secondary winding 97 of a transformer 98, whose primary winding 99 is connected to a suitable source of alternating current, while anode 96 connects with the opposite end of the secondary winding. Rectifier output is connected by way of a lead 100 and relay winding 85 to plate 84 of tube 83 and by way of a lead 101 and relay winding 91 to plate 90 of tube 89.

With no signals available at sliders 67 and 76 the plates of tubes 83 and 89 normally draw direct current supplied by the rectifier output, the static plate currents being of sufficient magnitude to maintain relays 86 and 92 energized so that the former relay maintains its movable armature 104, connected with one of leads 45, in engagement with a fixed contact 105 whereby the fixed phase winding 44 of elevator servo motor 43 is connected across its power supply.

It will now be apparent to those skilled in the art that during normal automatic pilot operation at which time normal craft attitudes are induced by the pilot, relays 86 and 92 will remain energized so that the fixed phase windings of the aileron and elevator servo motors will be connected to the source of power supply and thereby, when called upon, position aileron and elevator surfaces 30 and 28. In the event that, due to faulty operation, the aileron channel develops a hard-over signal resulting in an induced craft roll exceeding allowable and preset limits, the amount of roll displacement will be measured by gyro 56 and its pick-off 59 and an alternating voltage representing the amount of such displacement will be available at slider 67. Such signal is amplified by tube 78 and impressed thereby on grid 82 of tube 83. The alternating bias applied to the latter grid provides a pulsating D. C. plate flow. Due to such pulsating current the impedance of relay winding 85 to current flow therethrough increases to block off current flow whereby the relay becomes de-energized. As a result, relay armature 102 disengages fixed contact 103 to thereby disconnect the power supply from the fixed phase winding 36 of motor 35 and disable the aileron channel of the automatic pilot from operating aileron surface 30.

In a similar manner, when, due to abnormal operation, the elevator channel develops a hard-over signal causing the craft to climb or dive at an angle exceeding a preset and allowable angle, the amount of inclination will be measured by gyro 56 and pick-off 68, an alternating voltage representing the amount of such inclination appearing at slider 76. As in connection with the aileron channel, the signal is amplified by tube 80 and impressed on grid 88 of tube 89 whereupon a pulsating D. C. current is developed at plate 90. Because of the pulsating plate current the impedance of relay winding 91 increases to block current flow therethrough to de-energize the relay. Thereupon movable relay armature 104 disengages fixed contact 105 to remove the source of power supply for the fixed phase winding 44 of elevator servo motor 43 to disable the elevator channel of the automatic pilot from operating elevator surface 38.

There has thus been provided a novel safety monitor for an aircraft automatic pilot which is separate and distinct from the pilot and which operates automatically during predetermined craft attitudes induced by the automatic pilot to disable the latter from controlling the craft. Sliders 67 and 76 may be arranged on their resistors so that the novel monitor hereof will operate in response to roll attitudes exceeding about 35° and to pitch attitudes exceeding about 10°.

Although but one embodiment of the invention has been illustrated and described in detail, it is to be expressly understood that the invention is not limited thereto. For example, in place of the inductive type pick-offs shown for measuring the craft inclination about its roll or pitch axes a vertical gyro may be provided with contacts which would close to apply an alternating grid bias whenever the preset and allowable inclinations were exceeded. Various other changes can be made in the design and arrangement of the parts without departing from the spirit and scope of the invention as the same will now be understood by those skilled in the art.

I claim:

1. Apparatus for monitoring the attitude of an aircraft, the latter having an automatic pilot which when operating normally is adapted to induce normal craft position changes and which when operating abnormally is adapted to induce craft position changes exceeding predetermined limits, said automatic pilot including position maintaining means together with a servo motor operable thereby for operating a craft control surface, said monitoring apparatus comprising means operable in a first manner for enabling said servo motor to operate said control surface and operable in a second manner for disabling said motor from operating said control surface, means comprising craft position change responsive means independent of said automatic pilot for developing signals whose amplitudes vary with the amount of craft position changes induced by the automatic pilot, and means for operating said enabling means in said first manner during normal craft position changes and responsive to said signals during craft position changes exceeding said limits for operating said enabling means in said second manner.

2. Apparatus for monitoring the attitude of an aircraft, the latter having an automatic pilot which when operating normally is adapted to induce normal craft attitude changes within predetermined limits and which when operating abnormally is adapted to induce craft attitude changes exceeding predetermined limits, said automatic pilot including attitude maintaining means together with a servo motor operable thereby for operating a craft control surface, said monitoring apparatus comprising means operable in a first manner for enabling said servo motor to operate said control surface and operable in a second manner for disabling said motor from operating said control surface, means comprising a gyro vertical independent of said automatic pilot for developing signals corresponding to craft attitude changes induced by the automatic pilot, and means for operating said enabling means in said first manner during normal craft attitude changes and responsive to said signals during craft attitude changes exceeding said limits for operating said enabling means in said second manner.

3. Apparatus for monitoring the attitude of an aircraft, the latter having an automatic pilot which when operating normally is adapted to induce normal craft attitude changes and which when operating abnormally is adapted to induce craft attitude changes exceeding predetermined limits, said automatic pilot having at least one surface positioning servo motor and a power supply source therefor together with attitude maintaining means for operating said motor, said monitoring apparatus comprising control means operable in a first manner for establishing a connection between the servo motor and the power source and operable in a second manner for terminating the connection between the servo motor and the power source, means comprising craft attitude change responsive means independent of said automatic pilot for developing signals whose amplitudes vary with the amount of craft attitude changes induced by the automatic pilot, and means for operating said control means in said first manner during normal craft attitude changes and responsive to said signals during craft attitude changes exceeding said limits for operating said control means in said second manner.

4. Apparatus for monitoring the attitude of an aircraft, the latter having an automatic pilot which when operating normally is adapted to induce normal craft attitude changes and which when operating abnormally is adapted to induce craft attitude changes exceeding predetermined limits, said automatic pilot having at least one surface positioning servo motor and a power supply source therefor together with attitude maintaining means for operating said motor, said monitoring apparatus comprising control means operable in a first manner for establishing a connection between the servo motor and the power source and operable in a second manner for terminating the connection between the servo motor and the power source, means comprising a gyro vertical independent of said automatic pilot and a pick-off device operable by the gyro vertical for developing signals corresponding to craft attitude changes induced by the automatic pilot, means for operating said control means in said first manner during normal craft attitude changes and responsive to said signals during craft attitude changes exceeding said limits for operating said control means in said second manner, and means associated with said pick-off device for presetting the value of said signals at which said control means operates in said second manner.

5. Apparatus for monitoring the attitude of an aircraft, the latter having an automatic pilot which when operating normally is adapted to induce normal craft attitude changes and which when operating abnormally is adapted to induce craft attitude changes exceeding predetermined limits, said automatic pilot including attitude maintaining means together with a servo motor operable thereby for operating a craft control surface, said monitoring apparatus comprising control means operable in a first manner for enabling said servo motor to operate said control surface and operable in a second manner for disabling said motor from operating said control surface, means comprising a gyro vertical and a pick-off device operable thereby for developing signals corresponding to craft attitude changes induced by the automatic pilot, said gyro vertical and pick-off device being independent of said automatic pilot, and means for operating said control means in said first manner during normal craft attitude changes and responsive to said signals during craft attitude changes exceeding said limits for operating said control means in said second manner.

6. Apparatus for monitoring the attitude of an aircraft, the latter having an automatic pilot which when operating normally is adapted to induce normal craft attitude changes and which when operating abnormally is adapted to induce craft attitude changes exceeding predetermined limits, said automatic pilot including attitude maintaining means together with a servo motor operable thereby for operating a craft control surface, said monitoring apparatus comprising control means operable in a first manner for enabling said servo motor to operate said control surface and operable in a second manner for disabling said motor from operating said control surface, means comprising a gyro vertical and a pick-off device operable thereby for developing signals corresponding to craft attitude changes induced by the automatic pilot, said gyro vertical and pick-off device being independent of said automatic pilot, means for operating said control means in said first manner during normal craft attitude changes and responsive to said signals during craft attitude changes exceeding said limits for operating said control means in said second manner, a trim adjustment for presetting the electrical null of said pick-off device, and means for preselecting the value of the signals of said pick-off device at which said control means operates in said second manner.

7. Apparatus for monitoring the attitude of an aircraft, the latter having an automatic pilot which when operating normally is adapted to induce normal craft attitude changes and which when operating abnormally is adapted to induce craft attitude changes exceeding predetermined limits, said automatic pilot including attitude maintaining means together with a servo motor operable thereby for operating a craft control surface, said monitoring apparatus comprising control means operable in a first manner for enabling said servo motor to operate said control surface and operable in a second manner for disabling said motor from operating said control surface, means comprising a gyro vertical and a pick-off device operable thereby for developing signals corresponding to craft attitude changes induced by the automatic pilot, said gyro vertical and pick-off device being independent of said automatic pilot, and means comprising a vacuum tube having a plate element connected with said control means and a control electrode connected with said pick-off device for operating said control means in said first manner during normal craft attitude changes and responsive to said signals during craft attitude changes exceeding said limits for operating said control means in said second manner.

References Cited in the file of this patent

UNITED STATES PATENTS

| Number | Name | Date |
|---|---|---|
| 2,280,116 | Carlson | Apr. 12, 1942 |
| 2,415,429 | Kellogg 2nd et al. | Feb. 11, 1947 |
| 2,439,750 | Nisbet et al. | Apr. 13, 1948 |
| 2,480,574 | Hanna et al. | Aug. 30, 1949 |
| 2,487,793 | Esval et al. | Nov. 15, 1949 |